DUAL CHANNEL FREQUENCY SELECTIVE ATTENUATOR UTILIZING CROSS-COUPLED IMPEDANCE NETWORKS BETWEEN INPUT AND OUTPUT TERMINALS

Filed Oct. 3, 1960

INVENTORS A. M. GORDON
L. A. MEACHAM
BY V. P. Priolo
ATTORNEY 3,103,601

DUAL CHANNEL FREQUENCY SELECTIVE ATTENUATOR UTILIZING CROSS-COUPLED IMPEDANCE NETWORKS BETWEEN INPUT AND OUTPUT TERMINALS

Alan M. Gordon, Murray Hill, and Larned A. Meacham, New Providence, N.J., assignors to Bell Telephone Laboratories, Incorporated, New York, N.Y., a corporation of New York Filed Oct. 3, 1960, Ser. No. 59,962
7 Claims. (Cl. 307—88.5)

This invention relates to frequency selective waveshaping apparatus, and more particularly concerns arrangements for preferentially attenuating components of a multifrequency signal.

Frequency coded signaling systems generally require apparatus for separating coded digits from other energy oscillating within the systems's signaling band. In some systems an initial distinguishing characteristic of a digit is relative amplitude; that is to say, a wave having a sufficiently large amplitude in relation to all others simultaneously present is initially assumed to be a coded signal. When such a wave exists it is segregated and applied to a frequency selective register which is tuned to accept only waves having frequencies lying within the system's signaling band. If the segregated wave is not within the signaling band, it is rejected by the register and, therefore, does not falsely indicate a valid digit. Typical systems of this type are adapted to be responsive to a multidigit code, each digit lying within a distinct subgroup of frequencies of the system signaling band. In such arrangements a separate channel is generally required for each subgroup. Since the coded digits are all of approximately equal amplitude, each channel includes a band elimination filter which passes all energy oscillating at frequencies outside of the signaling band in addition to energy within its assigned subgroup, but rejects all other energy lying within the signaling band. By virtue of the band elimination filters, amplitude comparison is facilitated between any wave having a frequency within a subgroup and the sum of all other waves not within any other subgroup. One such system, operative in accordance with the foregoing principles, is a two-digit voice frequency telephone signaling system disclosed in a copending application in the names of L. A. Meacham and L. Schenker, Serial No. 743,434, filed June 20, 1958.

If, by chance, a wave having a sufficient relative amplitude in any channel is characterized by a frequency lying within the subgroup assigned to that channel but, nevertheless, is not a coded signal, it will be entered into the register, thereby constituting a false digit. One means for preventing such false registration requires the use of a frequency selective network operative to slightly attenuate waves of frequencies within the entire signaling band, while allowing waves characterized by frequencies outside of the signaling band to pass undiminished. Since in practice signaling waves are generally much stronger than other energy simultaneously propagating through the system, line noise or crosstalk for example, slightly attenuating a valid digit imposes a negligible burden upon its recognition. At the same time, however, slightly attenuating a wave which is within the signaling band, but nevertheless, is not a valid digit, will generally increase the likelihood of this wave failing to have sufficient amplitude in any channel relative to that of accompanying energy outside the signaling band. As was indicated, such a wave is not entered in the register and, therefore, does not falsely appear as a valid digit. Although these frequency selective attenuating networks considerably improve the reliability of frequency coded signaling systems, they do have attendant disadvantages, namely increased cost and space requirements.

Accordingly, it is one object of this invention to selectively attenuate the components of a multifrequency signal.

It is another object of this invention to attenuate to different degrees waves characterized by frequencies within a preselected band which are propagating in separate channels.

It is a further object of this invention to improve the reliability of multidigit frequency coded signaling systems by relatively inexpensive modifications to their existing constituent elements.

According to the invention, a plurality of signal translating channels are provided, each channel including a band elimination filter having its rejection band occupying a portion of the frequency spectrum distinct from each other band, and transmission means, controlled by energy translated through any particular channel, to regulate energy translated by other channels.

One basic feature of the invention comprises a cross-coupled impedance network connected between at least one pair of frequency selective signal translating channels. In one illustrative embodiment, to which the invention is by no means restricted, two signal translating channels are provided having a common input and separate output terminals. Included in each channel are an amplifier and a band elimination filter serially connected in that order, the rejection band of each filter occupying a distinct portion of the frequency spectrum. In accordance with the principles of invention, a pair of summing networks, each comprising a direct coupling and a cross-coupling arm, are arranged to interconnect the common input terminal, the input terminals of the amplifiers, and the output terminals of the filters. The summing network supplies the input terminal of each amplifier in part from the common input terminal and in part from the output terminal of the filter associated with the other amplifier. Signals applied to the common input terminal consisting solely of frequencies within a rejection band characterizing one of the channels are substantially attenuated in translation through that channel. As a result, the input of these signals to the other channel is diminished, being comprised of only energy coming directly from the common input terminal not supplemented by additional energy via the cross-coupling arm of the summing network. By these means, an input signal having frequencies within a predetermined band is substantially attenuated in one channel by a band elimination filter, and is slightly diminished at the output terminal of the other channel as a result of a reduction in that channel's input signal.

The foregoing and other objects and features of the invention will be more thoroughly understood by reference to the following detailed specification and drawing of which:

Figure 1:
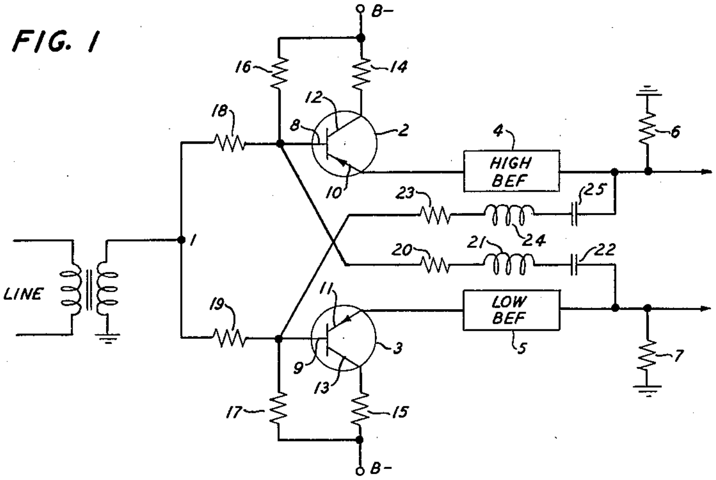
FIG. 1 illustrates a preferred embodiment of a frequency selective attenuator arranged in accordance with the principles of the invention.

With reference directed to FIG. 1 of the drawing, a preferred embodiment of the invention is illustrated comprising upper and lower signal translating channels respectively including a common input terminal 1, transistor amplifiers 2 and 3, and high and low band elimination filters 4 and 5 terminated in their characteristic impedances by resistors 6 and 7. Transistors 2 and 3 are of the three element variety respectively comprising base electrodes 8 and 9, emitter electrodes 10 and 11, and collector electrodes 12 and 13. Bias potential for the transistors is conventionally supplied from negative potential sources, depicted in the figure as B—, which are respectively connected to collectors 12 and 13 through resistors 14 and 15, and to bases 8 and 9 through high impedance resistors 16 and 17. While bases 8 and 9 are respectively connected to input terminal 1 through resistors 18 and 19, each of which serves as the direct-coupling arm of a summing network, emitters 10 and 11 are respectively connected to the input terminals of high and low band elimination filters 4 and 5. Although transistors 2 and 3 are shown as being of the P-N-P type, it is evident to one skilled in the art that those of the N-P-N variety may be conveniently substituted in the invention with only minor modifications to the bias arrangement being required.

Band elimination filters 4 and 5 each strongly attenuate applied signals having frequencies lying within a predetermined rejection band, but freely translate signals not within that band. Filters of this nature are well known in the art and may, for example, assume the configuration of a T network having a parallel resonant circuit included in each half of its transverse arm, and a series resonant circuit included in its stem. While filters 4 and 5 may be identical in structure, they differ in component values in order to allow their rejection bands, in accordance with one aspect of the invention, to occupy different portions of the frequency spectrum. Design formulas useful in shaping the frequency response of a band elimination filter to a desired characteristic are readily available, illustrative examples being contained on pages 236 through 239 of the book entitled "Transmission Networks and Wave Filters," authored by T. E. Shea, and published in 1929 by the D. Van Nostrand Company, Inc. To complete the circuit of the present invention, two paths, the first comprising serially connected resistor 20, inductor 21, and capacitor 22, and the second similarly comprising resistor 23, inductor 24, and capacitor 25, are respectively cross-coupled between base electrode 8 and the output terminal of filter 5, and between base electrode 9 and the output terminal of filter 4. The reactive components of the cross-coupling paths are proportioned to be resonant to signals having frequencies lying within the respective rejection bands of the filters associated with the output terminals to which they are connected. The cross-coupling paths comprise the cross-coupled arms of the summing networks of which resistors 18 and 19 are the direct-coupling arms.

Figure 2:
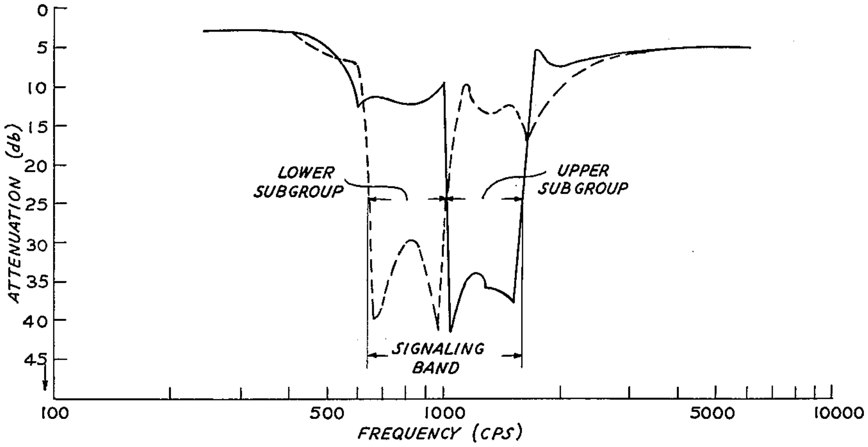
FIG. 2 depicts one specie of the frequency-attenuation response characteristic curve attainable by the frequency-selective attenuator of FIG. 1.

The overall frequency attenuation response characteristic of the invention is illustrated by FIG. 2 which depicts by dashed and solid curves, respectively, the response curve of the lower channel superimposed upon that of the upper channel. The response characteristic is composed of several distinct regions, namely the upper and lower subgroups which respectively embrace the rejection bands of the high and low band elimination filters, the signaling band which encompasses both subgroups, and the out-of-band region which lies both above and below the signaling band on the frequency scale. While the subgroups are shown in the figure as being adjacent, it is to be understood that the invention is readily modifiable to provide a response characteristic with separated subgroup regions. Considered individually, the response of each chanel is essentially trilevel, out-of-band energy passing substantially undiminished, while energy in one subgroup is strongly attenuated and energy in the other only slightly reduced. Although scales of numerical values are shown assigned to the coordinate axis, these are merely for convenience of description, and in no way are intended to restrict the scope of the invention.

In operation, energy applied to common input terminal 1 divides and is respectively transferred through direct-coupling resistors 18 and 19 to bases 8 and 9 of transistors 2 and 3. This energy is translated through the respective channels and thereafter appears at the output terminals of filters 4 and 5. The output signals of filters 4 and 5 are applied to bases 9 and 8, respectively, through the cross-coupling arms of the summing network. The reactive circuits comprising inductors 21 and 24, and capacitors 22 and 25 are tuned to compel signals applied to bases 8 and 9 from the cross-coupling arms to be summed substantially in phase with signals applied by the direct-coupling arms.

If the applied energy is characterized by frequency components not within the signaling band, a substantial portion of the signal applied to bases 8 and 9 through direct-coupling resistors 18 and 19 appears at the output terminals of filters 4 and 5. The output signals of filters 4 and 5 are applied through the cross-coupling arms to bases 9 and 8, respectively, in phase with the energy being applied through resistors 18 and 19. Thus, in accordance with the principles of the invention, the resultant output signals of the channels are derived in part from common input terminal 1 via direct-coupling resistors 18 and 19, and in part from the output terminals of filters 4 and 5 via the cross-coupling arms. Since these out-of-band signals from both summing arms are relatively strong, a corresponding relatively strong signal appears at the output terminals of the filters.

When, however, energy lying within one of the subgroups, the upper for example, is applied by resistors 18 and 19 to transistors 2 and 3, the output voltage of one of the filters, high band elimination filter 4 in this example, is sharply reduced due to an insertion loss in this frequency region of approximately 35 decibels. As a consequence, substantially no signal is applied to base 9 by the cross-coupling arm connected to sense signals appearing at the output terminal of filter 4. The signal appearing at the output terminal of filter 5, therefore, is derived almostly entirely from direct-coupling resistor 18, and is not enhanced by an additional component from the cross-coupling arm. Thus, for signals having frequencies lying within the upper subgroup, the output level of filter 4 is greatly attenuated, while the output level of filter 5 is reduced to a lesser degree. As is evident from a straightforward application of the superposition theorem the order of magnitude of signal reduction in a channel is regulated in accordance with the ratio of cross-coupling arm to direct-coupling arm impedance. To one skilled in the art it should be apparent without further explanation that when energy lying within the lower, rather than the upper, subgroup is applied to common input terminal 1, the relation between energy levels at the output terminals of the channels is reversed.

Figure 3:
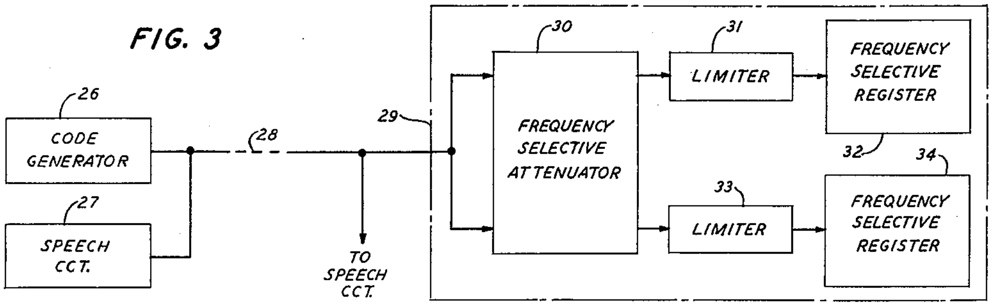
FIG. 3 shows a representative signaling system in which a frequency selective attenuator as contemplated by the present invention is particularly useful.

FIG. 3 of the drawing shows in block diagram form one practical system application to which the present invention is particularly suited. Pictured in the figure is a two-digit frequency coded signaling system, similar in certain aspects to the one disclosed in the aforementioned application, including a code generator 26, which, for example, may be the push-button dialing arrangement of a voice frequency subscriber signaling system, and a speech circuit 27, which may comprise the voice portion of a conventional telephone set, electrically coupled through a transmission line 28 to a receiver. The speech circuit 27 is arranged to be prevented from transmitting whenever code generator 26 is in operation. Included in the receiver are speech circuits (not shown) and a two-channel decoder 29 for identifying coded digits. Decoder 29 includes a frequency selective attenuator 30, arranged in accordance with the principles of the invention, having the output terminal of its upper channel coupled to the serial combination of limiter 31 and frequency selective register 32, and the output terminal of its lower channel coupled to similar elements 33 and 34. The channels are designed to indicate the presence of digits in different subgroups of the signaling band, register 32, for example, being tuned to accept only digits having frequencies lying within the lower subgroup, while register 34, on the other hand, is tuned to accept only digits within the upper subgroup.

In operation, a signal comprising either speech waves or voice frequency coded digits propagating at separate times through transmission line 28 are applied simultaneously to the upper and lower channel input terminals of frequency selective attenuator 30. After translation through attenuator 30, the divided signal, as modified in accordance with the frequency response characteristic of FIG. 2, is applied to limiters 31 and 33, each of which emits a square wave output signal having a fundamental frequency substantially equal to the frequency of the strongest component of the modified composite signal. The inherent amplitude comparison properties of a limiter, commonly known as "limiter capture," are fully discussed in the aforementioned patent application which, in addition, shows one embodiment of a limiter capable of exhibiting this phenomenon. The output signals of limiters 31 and 33 are respectively applied to registers 32 and 34, which respond only to energy oscillating at frequencies within their assigned subgroups.

If, at a particular time, the system input signal comprises only out-of-band energy, substantially no attenuation is effected by frequency selective attenuator 30. Consequently, the components capable of capturing limiters 31 and 33 are out-of-band and subsequently will be rejected when applied to registers 32 and 34. If at some other time the system input signal is a two-digit frequency coded signal, attenuator 30 effectively separates the digits, the upper subgroup digit being slightly attenuated in translation through the lower channel, while the lower subgroup digit is similarly slightly reduced in translation through the upper channel. Since coded digits are generally much stronger than other frequency components propagating with them through the system, line noise for example, slight attenuation does not prevent either their capture of limiters 31 and 33, or their subsequent registration in registers 32 and 34.

If the system input signal comprises a wave, a speech wave for example, which, although containing no coded digits, does have two strong components at frequencies lying within the signaling band, these components are separated into their respective channels and slightly attenuated in the same manner as were the coded digits. Since such components are not likely to be individually much stronger than all out-of-band and other in-band signal components applied to the respective limiters, slight attenuation of signaling band components through attenuator 30 markedly increases the probability that limiters 31 and 33 will be prevented from being captured by any pair of in-band components. Inasmuch as registers 32 and 34 will not respond to out-of-band energy, protection against false digit registration, and hence system reliability, is substantially enhanced.

Although only a single illustrative embodiment of the invention has been described herein, it is apparent to one skilled in the art that numerous other arrangements of both dual and multichannel frequency selective attenuators may be devised without departing from the scope and spirit of the invention.

What is claimed is:

1. Frequency selective attenuating apparatus comprising at least first and second signal translating channels having a common input and separate output terminals, a band elimination filter connected in each of said channels, the rejection band of each of said filters occupying a different portion of the frequency spectrum, and separate transmission means controlled by energy translated through any one of said channels for regulating energy in the remainder of said channels, said transmission means including circuit means for applying signals induced at the output terminals of any of said channels to the others of said channels in like phase with signals applied to said input terminals.

2. Frequency selective attenuating apparatus comprising at least first and second signal translating channels having common input and separate output terminals, a band elimination filter connected in each of said channels, the rejection band of each of said filters occupying a different portion of the frequency spectrum, amplifying means connected in each of said channels, and transmission means controlled by energy in any one of the channels for regulating energy in the other of said channels, said transmission means including circuit means for applying signals induced at the output terminals of any of said channels to the others of said channels in like phase with signals applied to said input terminals.

3. Frequency selective attenuating apparatus comprising first and second signal translating channels, a band elimination filter connected in each of said channels, the rejection band of each of said filters occupying a different portion of the frequency spectrum, and impedance means interconnecting said channels to regulate energy in either one of said channels in response to energy translated through the other one of said channels, said impedance means being disposed so as to apply at least a portion of the energy in either of said channels to the other of said channels in like phase with energy propagating in said other of said channels at the point of application.

4. Frequency selective attenuating apparatus comprising first and second signal translating channels, means for applying signals to said first channel, means for applying signals to said second channel, a band elimination filter connected in each of said channels, the rejection band of each of said filters occupying a different portion of the frequency spectrum, amplifying means connected in each of said channels, and impedance means cross connected between the input and output terminals of said channels, said impedance means being disposed so as to apply at least a portion of the signal in either of said channels to the other of said channels in like phase with signal propagating in said other of said channels at the point of application.

5. Apparatus for reducing the amplitude of electrical signals in a selected frequency band comprising first and second wave filters each characterized by a frequency response in which waves oscillating within a predetermined frequency band are substantially attenuated and waves oscillating outside of said band are translated substantially unattenuated, said bands associated with said filter occupying mutually distinct portions of the spectrum, means for simultaneously applying a first input signal to input terminals of said wave filters, means for providing first and second circuit paths respectively connected to input terminals of said first and second wave filters for applying second input signals thereto, said first and second paths being connected in such manner that said second input signals are applied to said wave filters in like phase with said first input signal, said first path being further connected to translate energy only when said first input signal comprises energy oscillating outside of the band associated with said second wave filter, and said second path being further connected to translate energy only when said first input signal comprises energy oscillating outside of the band associated with said first filter.

6. Apparatus for reducing the amplitude of electrical signals in a selected frequency band in accordance with claim 5 wherein said first and second circuit paths include attenuating means.

7. Apparatus for reducing the amplitude of electrical signals in a selected frequency band in accordance with claim 6 wherein said first and second circuit paths also include network means having phase shift characteristics substantially equal to the phase shift characteristics of said wave filters.

References Cited in the file of this patent

UNITED STATES PATENTS 2,771,518 Sziklai ---------------- Nov. 20, 1956